United States Patent Office 3,503,753
Patented Mar. 31, 1970

3,503,753
COLOR STABILIZATION IN WHEAT PRODUCTS
Leland K. Dahle, Minneapolis, Minn., assignor to Peavey Company, Minneapolis, Minn., a corporation of Minnesota
No Drawing. Filed July 7, 1966, Ser. No. 563,379
Int. Cl. A23l 1/10, 1/16
U.S. Cl. 99—80                                  7 Claims

ABSTRACT OF THE DISCLOSURE

Disclosed are milled wheat products and alimentary paste food products having golden yellow color and containing effective color-stabilizing amounts of citric acid alone or of citric acid in combination with ascorbic acid. Methods of making such color-stabilized products are also disclosed.

The present invention relates to improvements in ground wheat products used to produce alimentary paste food products such as macaroni, spaghetti and noodles. This invention relates particularly to the stabilization of color in ground wheat products and alimentary paste food products produced therefrom.

It is customary to use wheaten materials such as semolina, fabrina, durum wheat flour or unbleached flour milled from hard spring wheat or hard winter wheat for the preparation of macaroni and noodle products. In preparing such products the ingredients which may be one or more of the above mentioned wheat materials and enriching substances, or other common additives, such as vitamins, salt and di-sodium phosphate, are dry mixed and then made in a dough or paste with water or milk, extruded into the desired shape and dried.

This processing, as well as storage of the flour or other wheat material after milling, is attended by a loss of the very desirable characteristic golden yellow color of the unbleached milled products of wheat, particularly durum. This desirable bright yellow color is identified with the absence of brown pigments and with the presence of a relatively high carotenoid pigment content, mainly Xanthophylls. The resulting macaroni and noodle products prepared from these materials consequently do not possess their characteristic and desirable lemon yellow color, which is indicative of a better quality in the finished products. Avoidance of this color loss by providing durum semolina, durum flour or other milled wheat materials which retain their characteristic yellow color is a desirable objective.

During the processing of the wheat milled products, some brown pigment is formed because of a complex chemical reaction as yet not completely understood. Furthermore, some carotenoid pigment is destroyed because of lipid oxidation reactions. The brown color arising from brown pigments formed in the finished products is undesirable, as is the loss of carotenoid pigments through oxidation. Both these effects are intensified on the aging of wheat and/or its milled products and are more pronounced in wheat and its products than are high in moisture. Oxidative loss of carotenoid pigment is greater when a milled product is derived from hard spring or hard winter wheat because such wheats have a higher pro-oxidant stress due to increased amounts of the enzyme lipoxidase.

In Patent No. 3,043,699, it is disclosed that unbleached flour or other milled wheat material used for macaroni and noodle products may be stabilized against color loss due to the loss of carotenoid pigments by the incorporation of a small quantity of L-ascorbic acid. As yet, however, there is no known method of stabilizing wheat products against color loss due to brown pigment formation.

It is an object of the present invention to provide for the stabilization against color loss in unbleached flour or other milled wheat material used for alimentary paste due to the formation of brown pigment.

It is a further object of the present invention to provide for the stabilization of unbleached flour or other milled wheat products used for macaroni and noodle products against color loss due to both a formation of brown pigment and the loss of carotenoid pigment.

It has been found according to the present invention that unbleached flour, semolina or other milled wheat products used for macaroni and noodle products may be stabilized against the color change caused by brown pigment formation by the incorporation of small, but effective, quantities of citric acid, the amount required varying with the amount of browning potential in the particular milled product stabilized. It has been further found according to the present invention that small, but effective, quantities of citric acid enhance the effect of ascorbic acid in the stabilization against carotenoid pigment loss as disclosed in Patent No. 3,043,699.

The amount of citric acid necessary to produce color stabilization will vary depending on the particular wheat product sought to be stabilized and on the particular wheat crop from which the wheat material is derived. Wheat crops vary from season to season, from region to region and even with a particular reigon; therefore, the particular amount of citric acid necessary to accomplish the desired result must be determined with respect to the particular wheat products sought to be stabilized. Normally, the incorporation of no more than about 0.1% of citric acid will accomplish the desired result. In some instances as little as 0.03% or less will be effective to stabilize a wheat product against browning. In cases where both citric acid and ascorbic acid are added to stabilize the wheat product against both brown pigment formation and carotenoid pigment loss, the same factors conisdered above must be considered. Normally, quantities of about 0.03 to 0.1% of citric acid are necessary.

Although citric acid as such is preferred in the practice of the invention, other substances may be used which supply citric acid in the quantities above indicated and which do not exert any deleterious effect on the flour or the macaroni and noodle product prepared from it.

Furthermore, it must be pointed out that citric acid does not achieve the results produced by the addition of ascorbic acid only to wheat products as disclosed in Patent No. 3,043,699. Furthermore, it is to be understood that the addition of ascorbic acid alone to wheat products does not achieve the results produced by the addition of citric acid to milled wheat products. Rather, the presence of each acid enhances the effect of the other in stabilizing the milled wheat product against color loss; the presence of ascorbic acid inhibiting carotenoid pigment loss and the presence of citric acid inhibiting the brown pigment formation.

Any desired method for incorporating citric acid and ascorbic acid in the wheat products may be employed. For example, citric acid may be mixed with a small portion of the milled wheat product to be stabilized followed by incorporating this small portion into the bulk of the milled product with mixing and agitating; the proportion of citric acid to wheat product being selected so that the mixing of the smaller portion of wheat product with a predetermined larger amount of wheat product will yield a final product containing the ultimately desired percentage of citric acid. However, any other desired method such as spraying a solution on the milled stock may be employed to add the citric acid. Wheat products treated in accordance with the present invention during periods of storage retain the characteristic golden yellow color. Upon subsequent preparation of dough from the mixture by the addition of water in a mixing chamber followed by extrusion through dies to form shaped units of dough and then drying, the retained color of the wheat provides the desired yellow shade in the final product.

The invention is applicable to any wheaten product used in the manufacture of alimentary pastes, such as the macaroni and noodle products set forth in part 16, Chapter I, Title 21, entitled "Food and Drugs, Alimentary Pastes; Definitions and Standards of Identity, Macaroni and Noodle Products," pages 23–29 inclusive of the "Definitions and Standards for Food" issued by the Food and Drug Administration, Federal Security Agency under the Food and Drug Administration, Federal Security Agency under the Food, Drug and Cosmetic Act. The more common wheaten products used for this purpose include semolina, durum flour, farina, wheat flour or any combination of the two or more of these products. Also, the invention is fully applicable where various enriching ingredients are utilized such as vitamins and minerals, e.g. B vitamins (riboflavin, thiamine, niacin, niacinamide), vitamin D, iron and calcium.

As used in the appended claims, the term "flour," includes all wheaten products and mixtures included in the above referenced "Definitions and Standards of Identity," whether coarser ground and bolted as in the case of semolina and farina or ground and bolted to the finest of flour used in the more common and limited sense.

The invention is further described with reference to the following examples which constitute complete specific embodiments thereof, but are not to be construed as limitations:

EXAMPLE 1

Citric acid in the form of a fine powder is first diluted by mixing with semolina (prepared by grinding and bolting cleaned durum wheat to such fineness that it passes a 20 mesh sieve (U.S. standard screen) but not more than three percent passes a 100 mesh sieve, the wheat being bran coat and germ freed to an ash content on a moisture freed basis of not more than 0.92% and having a moisture content of not more than 15%). The proportions of citric acid and semolina are such that when one ounce of the resulting "diluted" mixture is added to 100 lbs. of semolina, a citric acid content of 0.001% is obtained. The dilute mixture is added to the bulk of semolina with the aid of a powder feed, and the product is subjected immediately to complete mixing for uniform distribution. During periods of storage, the golden yellow color of the durum wheat is retained. The treated product was then processed into spaghetti in the conventional methods currently employed. The spaghetti was then tested for color, cooking quality and taste. The data obtained from tests on spaghetti processed from flours treated as above containing varying amounts of citric acid are tabulated below:

TABLE I

| Citric acid, p.p.m. | Color | | Cooking quality | Taste |
|---|---|---|---|---|
| | Brightness index | Visual appearance | | |
| 0 | 10.0 | Dull yellow | Satisfactory | Good. |
| 500 | 10.5 | Bright vivid yellow. | do | Do. |
| 1,000 | 10.0 | do | do | Do. |

Measurement of the carotenoid pigment content indicated that the presence of citric acid did not affect the oxidative loss of carotenoid pigments and, thus, the increasingly vivid and brighter color is attribute to inhibition to the browning reaction. Citric acid did not alter the cooking quality or the taste of the spaghetti at the levels employed.

EXAMPLE 2

This example shows the effect of citric acid on the brown pigment forming reaction which occurs when ground wheaten materials are processed into macaroni and noodle products. An indication of the extent of browning is given by the absorbance at 275 m$\mu$ of a 95% ethanol extract of ground spaghetti as measured by a Beckmann model D. U. spectrophotometer. This test is more fully explained in an article by R. J. Stenberg, et al., entitled "Studies on Accelerated Browning in Starch Pastes Containing Various Bread Ingredients," in Cereal Chemistry, vol. 37 at pages 623 through 637 (1960). Basically, the test involves grinding spaghetti made from ground wheaten products and extracting with a 95% ethanol solution and determining its absorbance at a wave length of 275 m$\mu$. The higher the absorbance at this particular wave length, the greater the extent of brown pigment formation.

In this example, citric acid, ascorbic acid and a combination of the two were incorporated in durum flour which was then processed into spaghetti in the same manner as Example one. The spaghetti was ground and subjected to the above described measurement for browning. The data is tabulated below:

TABLE II

| Sample | Citric acid p.p.m. | Ascorbic acid, p.p.m. | Absorbance 275m$\mu$ |
|---|---|---|---|
| 1 | 0 | 0 | 0.629 |
| | 0 | 100 | 0.625 |
| | 300 | 0 | 0.602 |
| | 500 | 0 | 0.600 |
| 2 | 300 | 100 | 0.613 |
| | 0 | 0 | 0.650 |
| | 400 | 200 | 0.560 |

From this data, it is apparent that brown pigment formation is at a maximum where there is no citric acid present. It is also apparent that the presence of ascorbic acid in the absence of citric acid likewise has no effect on the brown pigment formation. However, where citric acid is present and where citric acid in combination with ascorbic acid is present, there is a reduction in brown pigment formation.

EXAMPLE 3

Ascorbic acid alone and a combination of ascorbic acid plus citric acid were incorporated in an aged flour of high oxidative stress and high suseptability to browning. The samples were processed into spaghetti in the same manner as in Example 1 and tested for pigment content. The color difference due to browning was readily apparent. The data is tabulated below:

TABLE III

| Ascorbic acid p.p.m. | Citric acid p.p.m. | Carotenoid Pigment retained, percent | Color |
|---|---|---|---|
| 0 | 0 | 55.0 | Dark brown. |
| 200 | 0 | 64.0 | Do. |
| 200 | 400 | 73.0 | Light brown. |

The desirable yellow color, as reflected by the amount of carotenoid pigment retained in the spaghetti after processing, was best in the sample containing ascorbic acid plus citric acid, thus indicating an enhancing effect of citric acid on ascorbic acid. The lighter brown color observed in the sample containing ascorbic acid plus citric acid is attributable to inhibition of the browning reaction effected by the citric acid.

EXAMPLE 4

Flour was milled from durum wheat of high sprout damage. This flour is susceptible to browning and to oxidative loss of carotenoid pigment during ageing and processing into spaghetti. Two samples of this flour were processed into spaghetti in the method of Example 1; one a control containing no additives and the other containing 100 p.p.m. of ascorbic acid plus 1000 p.p.m. of citric acid. The resultant spaghetti was compared for color and carotenoid pigment content with the following results:

TABLE IV

| Additive | Color | Carotenoid pigment Content, p.p.m. |
|---|---|---|
| None | Dark, dull yellow | 5.00 |
| Ascorbic Acid, 100 p.p.m., citric acid, 1,000 p.p.m. | Bright yellow | 5.33 |

The sample containing ascorbic acid and citric acid produced spaghetti of a brighter yellow color which is attributable to the inhibition of the browning effected by the citric acid. Furthermore, the sample produced spaghetti of a higher carotenoid pigment content which is attributable to the anti-oxidant effect of ascorbic acid and citric acid.

What I claim is:

1. A method of stabilizing alimentary paste food products selected from the group consisting of wheat and flour prepared from milled wheat products against loss of characteristic golden yellow color identified with the absence of brown pigments, which comprises mixing citric acid with said wheat products in amounts sufficient to substantially prevent the formation of said brown pigments.

2. A method according to claim 1 wherein the amounts of citric acid is less than about 0.1%.

3. Milled wheat products selected from the group consisting of wheat and flour and having a characteristic golden yellow color identified with the absence of brown pigments and with the presence of carotenoid pigment, said wheat products containing citric acid in an amount sufficient to substantially prevent the loss of said golden yellow color through the formation of said brown pigments and ascorbic acid in an amount sufficient to substantially prevent the destruction of said carotenoid pigment.

4. Milled wheat products according to claim 3 having a citric content of less than about 0.1% and an ascorbic acid content of less than about 0.01%.

5. Alimentary paste food products prepared from the milled wheat products of claim 3.

6. A method of stabilizing alimentary paste food products selected from the group consisting of wheat and flour prepared from milled wheat products against loss of characteristic golden yellow color identified with the absence of brown pigments and with the presence of carotenoid pigment, which comprises mixing with said wheat products citric acid in an amount sufficient to substantially prevent the formation of said brown pigments and ascorbic acid in an amount sufficient to substantially prevent the destruction of said carotenoid pigment.

7. A method according to claim 6 wherein the amount of citric acid is less than about 0.1% and the amount of ascorbic acid is less than about 0.01%.

References Cited

UNITED STATES PATENTS

| 2,025,705 | 12/1935 | Bienenstock et al. | 99—85 |
| 2,215,168 | 9/1940 | Allred | 99—148 |
| 2,559,022 | 7/1951 | Lolkema | 99—83 |
| 3,043,699 | 7//1962 | Schmalz et al. | 99—85 |

RAYMOND N. JONES, Primary Examiner

U.S. Cl. X.R.

99—85, 93